Patented Jan. 5, 1954

2,665,270

UNITED STATES PATENT OFFICE 2,665,270

PROCESS FOR PREPARING COPOLYMERS OF STYRENE AND DIVINYLBENZENE

Robert N. Haward and Joyce Elly, Trafford Park, Manchester, England, assignors to Petrocarbon Limited, London, England No Drawing. Application December 10, 1951, Serial No. 260,948

Claims priority, application Great Britain December 21, 1950

7 Claims. (Cl. 260—88.1)

This invention relates to the production of copolymers of styrene and divinylbenzene.

Such copolymers may be produced by the copolymerisation of styrene with a pure or substantially pure divinylbenzene, but they are more generally formed for commercial purposes from styrene and the commercially available concentrate of divinylbenzene which contains an appreciable proportion of ethylvinylbenzene. Though in the latter case the products would possibly be more correctly termed ternary polymers, they are usually referred to as copolymers of styrene and divinylbenzene, since the divinylbenzene, which gives rise to the cross-linking action, is regarded as the active constituent of the concentrate.

In this specification and in the claims the expression "copolymers of styrene and divinylbenzene" includes the products formed from styrene and concentrates of divinylbenzene containing an appreciable proportion of ethylvinylbenzene and also those formed from styrene and purer forms of divinylbenzene.

Considerable difficulty has hitherto been experienced in the production of copolymers of styrene and divinylbenzene by the suspension polymerisation process but it has now been found that satisfactory and consistent results may be obtained by the use of bentonite as a suspension stabiliser, aided by the presence in the aqueous suspension medium of gelatin and a soluble, substantially neutral inorganic salt.

The invention thus consists in a process for the production of copolymers of styrene and divinylbenzene by a suspension polymerisation process which comprises polymerising a mixture of styrene and divinylbenzene whilst it is maintained dispersed in an aqueous medium in which there are also dispersed finely divided particles of bentonite and in which there has been dissolved gelatin and a substantially neutral inorganic salt.

The ratio by weight of the mixture of monomers to water in the suspension in the process of the invention is preferably from 1:5 to 3:2.

The polymerisation is preferably carried out in the presence of a monomer-soluble polymerisation catalyst such, for example, as benzoyl peroxide, tertiary butyl perbenzoate, or azo-bisisobutyronitrile and preferably at a temperature of from 70 to 120° C.

In the process of the invention, the amount of bentonite present in the suspension is preferably from 0.001% to 0.05% by weight of the whole system; the amount of gelatin present is preferably from 0.0005 to 0.01% by weight of the whole system; and the amount of inorganic salt present is preferably from 0.01 to 0.2% by weight of the whole system.

Inorganic salts suitable for use in the process of the invention are the substantially neutral salts of the alkali or alkaline earth metals with anions of valency 1 or 2. Examples are potassium chloride, sodium chloride, potassium sulphate, sodium sulphate, calcium chloride and potassium thiocyanate.

By "substantially neutral salt" is meant a salt which in solution in water in the concentrations used in the process has a pH value between 5 and 9 and preferably between 6 and 8.

The divinylbenzene used in the process of the invention may be the commercially available divinylbenzene concentrate, which normally contains approximately 50% by weight of divinylbenzene and a somewhat smaller proportion of ethylvinylbenzene or a purer form of divinylbenzene.

The following examples illustrate the process of the invention:

Example 1

276 ccs. of demineralised water, 140 ccs. of styrene and 24 ccs. of divinylbenzene were stirred together in a 500 cc. flask, fitted with a reflux condenser and heated to 90° C. 0.4 gm. of benzoyl peroxide was then added and the stirring and heating continued. After 10 minutes, bentonite in suspension in water was added, one minute later a solution of potassium chloride in water was added and one minute after that a solution of gelatin in water was added. The amounts of bentonite, potassium chloride, and gelatin added in this manner were such that they constituted respectively by weight of the total system 0.02%, 0.05%, and 0.004%. The additional water added with the bentonite, potassium chloride and gelatin was 20 ccs.

Stirring and heating were continued for 9 hours when hard pearls or beads were formed.

The product was found to be eminently suitable for the production of ion exchange resins.

Example 2

320 ccs. of demineralised water, 120 ccs. of styrene and 40 ccs. of divinylbenzene were stirred together in a 500 cc. flask, fitted with a reflux condenser and heated to 90° C. 0.64 gm. of the polymerisation catalyst sold under the trade name "Porofor 254" (believed to be an azonitrile catalyst) was then added and the stirring and heating continued. After ten minutes, bentonite in suspension in water was added, one minute later a solution of potassium chloride in water was added and one minute after that a solution of gelatin in water was added. The amounts of bentonite, potassium chloride, and gelatin added in this manner were such that they constituted respectively by weight of the total system 0.02%, 0.05%, and 0.004%. The additional water added with the bentonite, potassium chloride and gelatin was 20 ccs.

Stirring was continued for 2 hours at 90° C., followed by stirring for 7 hours at 98° C. Hard pearls or beads were obtained.

*Example 3*

140 ccs. of monomer, consisting of 57 parts by volume of styrene to 5 parts by volume of divinylbenzene, and containing 0.4 gm. of benzoyl peroxide, were added to 280 ccs. water, stirred at 840 revs./min. by a V-shaped stirrer, in a 500 cc. flask, situated in an oil bath at 91° C.

After 15 minutes, 0.36 gm. bentonite were added. After 16 minutes, 4.05 ccs. of a 5% solution of potassium chloride were added and after 17 minutes 9.7 ccs. of a 0.5% solution of gelatin were added.

The mixture was stirred for 12 hours when fine hard pearls were obtained.

The divinylbenzene used in the above examples was a commercial concentrate having the following analysis:

| | Per cent by weight |
|---|---|
| Divinylbenzene | 48.0 |
| Ethylvinylbenzene | 42.1 |
| Diethylbenzene | 9.1 |
| Naphthalene | 0.5 |
| Tertiary butyl catechol (inhibitor) | 0.1 |

The bromine No. was 167.7.

The bentonite used in each case was that sold under the trade name "Bentonil C."

The size of the beads produced by the process of the invention may be varied by varying the quantity of bentonite and/or gelatin and/or inorganic salt present. Thus by increasing the quatities of these ingredients the size of the beads formed is decreased.

The products of the process have been found to be eminently suitable for use, after suitable chemical treatment, as ion exchange resins. They may also be used for forming reflecting surfaces such as are used on road signs and cinema screens and for decorative purposes. A coloured product may be obtained by the addition of suitable dyes prior to polymerisation.

We claim:

1. A process for the production of copolymers of styrene and divinylbenzene by a suspension polymerisation process, which comprises polymerising a mixture of styrene and divinylbenzene whilst it is maintained dispersed in an aqueous medium in which there are also dispersed finely divided particles of bentonite and in which there has been dissolved gelatin and a substantially neutral inorganic salt selected from the class consisting of the substantially neutral inorganic salts of alkali metals and alkaline earth metals.

2. A process as claimed in claim 1 in which the divinylbenzene is in the form of a commercial concentrate of divinylbenzene containing an appreciable proportion of ethylvinylbenzene.

3. A process as claimed in claim 1 in which the amounts of bentonite, gelatin, and inorganic salt present in the aqueous medium are from 0.001 to 0.05%, from 0.0005 to 0.01% and from 0.01 to 0.2% by weight of the whole system respectively.

4. A process as claimed in claim 1, in which the ratio by weight of the mixture of monomers to water in the aqueous medium is from 1:5 to 3:2.

5. A process as claimed in claim 1 in which the polymerisation is carried out in the presence of a polymerisation catalyst.

6. A process as claimed in claim 1 in which the polymerisation is carried out at a temperature from 70 to 120° C.

7. A process as claimed in claim 1 in which the said neutral salt is potassium chloride.

ROBERT N. HAWARD.
JOYCE ELLY.

References Cited in the file of this patent

UNITED STATES PATENTS

| Number | Name | Date |
|---|---|---|
| 2,171,765 | Rohm | Sept. 5, 1939 |